Dec. 16, 1947.　　　P. F. DANIELSON　　　2,432,728
PISTON EXPANDER
Filed March 24, 1945
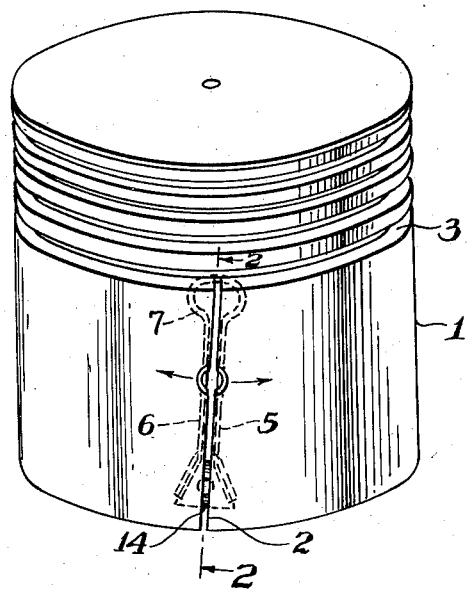
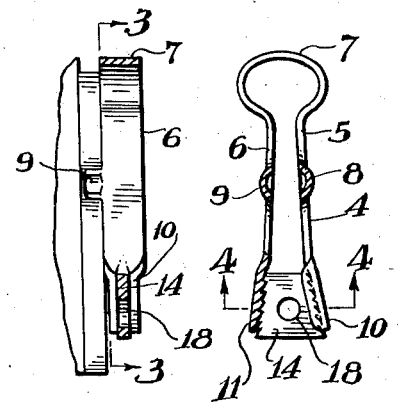
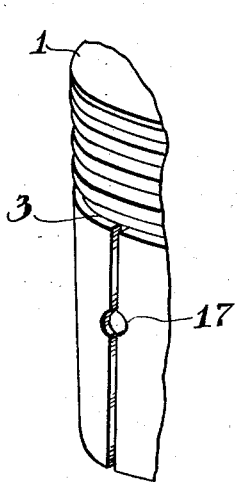
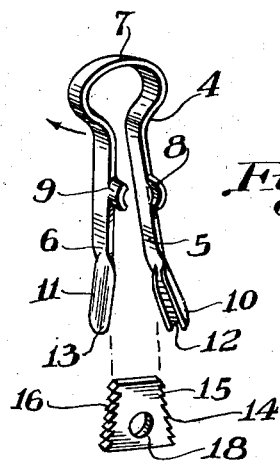
INVENTOR,
Paul F. Danielson
BY
Attorney.

Patented Dec. 16, 1947

2,432,728

UNITED STATES PATENT OFFICE 2,432,728

PISTON EXPANDER

Paul F. Danielson, Los Angeles, Calif.

Application March 24, 1945, Serial No. 584,662

2 Claims. (Cl. 309—12)

The present invention relates to a piston expander of a type which may be readily inserted in a piston for expanding the skirt thereof, without in some instances requiring that the piston be removed from the cylinder block.

The present expander is of a character which permits the oil pan to be dropped so that access may be had to the pistons.

It is well known that both old and new pistons sometimes do not fit properly within a cylinder, with the result that what is known as piston slap develops. However, it is essential in overcoming piston slap that the skirt still be allowed to move as required, otherwise a binding action as well as rapid wear will result.

An object of the present invention is the provision of a piston expander which may be placed at any desired location in the skirt length and which will in addition to expanding the skirt still allow the skirt to move radially during reciprocation of the piston within the cylinder.

Most piston expanders with which the inventor is familiar positively expand the skirt and do not allow contraction of the skirt during working cycles in an engine cylinder.

Other objects of the invention include a piston expander which is of simple construction, readily installed, inexpensive in cost of manufacture, and generally superior to devices now known to the inventor.

With the above mentioned and other objects in view, the invention consists in the novel and useful provision, formation, construction, association and relative arrangement of parts, members and features, all as shown in a certain embodiment in the accompanying drawing, described generally and more particularly pointed out in the claims.

In the drawing:

Fig. 1 is a perspective view of a piston incorporating the improved piston expander;

Fig. 2 is a fragmentary sectional view on the line 2—2 of Fig. 1;

Fig. 3 is a sectional view on the line 3—3 of Fig. 2;

Fig. 4 is a sectional view on the line 4—4 of Fig. 3;

Fig. 5 is a fragmentary perspective view of a portion of the piston prior to installation of the piston expander;

Fig. 6 is a perspective view of one element of the piston expander; and,

Fig. 7 is a perspective view of a further element of the piston expander.

Referring now with particularity to the drawing:

I have shown at 1 a piston of the ordinary form, which usually includes a split skirt, so called because it usually incorporates one or more slots 2, which interconnect with horizontal slots 3. Such slot 2 allows the skirt to radially expand and contract during a working movement of the piston within a cylinder. However, pistons sometimes vary as to diameter when new, and what is known as piston slap develops. Also piston slap is quite prevalent in old pistons which have become worn. To overcome piston slap it is customary to expand the skirt and often to renew the piston rings. However, the present invention contemplates overcoming that type of slap which develops as a result of the skirt of the piston becoming worn to an appreciable degree. Rather than renew the old piston with a new piston, the present expander may be inserted within the piston to expand the skirt and overcome the slap. The majority of piston expanders require a complete removal of the piston from the engine cylinder. With the present invention such removal is unnecessary, as the operation to be performed by the piston may be performed when the piston has reached its lower excursion of movement within the cylinder, and through the simple expedient of removing the oil pan permit access to the piston.

The piston expander is designated as an entirety by 4, and includes a pair of arms 5 and 6, interconnected by a loop 7. The loop is oval in appearance for the purpose of permitting wide angle separation between the arms and as a space saver, considering the length of the arms including the loop. Transversely extending from the arms and at some zone between the loop and the outermost ends of said arms are projections or lugs 8 and 9. These lugs or projections are semicircular, as shown.

The arms 5 and 6 are provided with end portions 10 and 11, which are relatively divergent and at an angle to the longest length of said arms. These divergent end portions are semicircular in cross section to provide elongated channels 12 and 13.

Adapted for reception between the channels 12 and 13 is an expander key 14. This key has angularly related sides provided with teeth 15 and 16. When the key is inserted between the ends 10 and 11 it is guided in its movement by the channels 12 and 13, and the teeth are so shaped as to permit ready entrance of the key between the ends, while preventing outward movement of the key therefrom.

The operation, uses and advantages of the invention are as follows:

It is possible for the workman to drop the oil pan and to drill a hole in the piston skirt in such a manner that the hole splits the piston skirt along the slot 2, as for instance indicated at 17. Such a drilling may be done by an angular-headed drill, using a drill guide, or the piston may be removed from the cylinder block and drilled in the usual manner. The position of the hole 17 is regulated in accordance with the portion of the skirt that is to be directly expanded.

For instance, in the figures the hole 17 is nearer the top of the skirt than the bottom thereof, and expansion will therefore occur in the upper portion of the skirt. As the expander 4 is formed of spring-like material, the arms, due to the loop, tend to separate, as for instance illustrated in Fig. 6. The operator, either by means of his fingers or a tool, closes the arms together and pushes the expander upwardly within the skirt of the piston until the lugs 8 and 9 are in such position as to readily enter the bore or hole 17. As the lugs or projections are curved peripherally, they readily conform to the curvature of the hole 17, and a lug will lie on either side of the slot 2 and engage the skirt portion of the piston. By means of a tool or by the fingers, the key 14 may then be inserted between the channels 12 and 13 and pushed inwardly to cause separation of the arms 5 and 6. Separation of the arms will cause the projections or lugs 8 and 9 to expand the skirt, and the key teeth 15 and 16 will prevent the key from being dislodged from the divergent portions 10 and 11. It is evident that the key forms a solid abutment between the end portions 10 and 11 of the arms. However, the skirt is permitted to move radially under actual working conditions, due to the fact that the loop 7 permits the arms 5 and 6 to move inwardly and outwardly. The flat stock portion of the arms is relatively long in comparison to the length of the angular ends thereof, and the projections or lugs are substantially intermediate the flat length arm portions as shown on the drawing. The result is that the tendency to compress the arms only tightens the key separator in its engagement with the angular extremities, and does not tend to release the key. The arms in the zone of the projections 8 and 9 are subjected to compressive stress exerted by the piston skirt portions on either side of the slot 2. However, such compressive stress is at all times resisted by the loop 7, with the result that there is a force at all times acting on the arms to oppose the compressive force exerted by the piston skirt portions. The non-compressive portion for the expander is of course that portion adapted to receive the key separator. The key separator may be provided with a transverse bore or perforation 18 to allow the operator to reach in with a hook to engage said hole and remove the key if such removal becomes necessary, or if a key of greater width is required. The present piston expander is adaptable for use in pistons of any thickness; the thickness of the skirt being capable of measurement, the operator immediately knows the proper length of the projections or lugs 8 and 9. That portion of the expander adjacent the lugs lies against and bridges the piston skirt in the zone of the slot 2.

The present invention provides an easy and quick means for overcoming piston slap in modern aircraft engines on the field of operation, particularly where said engines require a minor overhaul and time is of essence and parts difficult to secure. A mechanic may easily perform the necessary operation to expand the skirt of each piston by utilizing the expander of the present invention. Furthermore, the expander described does not, in its use, close the slot in the piston skirt, for the reason that the arms 5 and 6 lie on opposite sides of the slot, and therefore do not interfere with whatever advantage such a slot in a piston skirt provides, see Fig. 1.

I claim:

1. A device for expanding the split skirt of a piston, including a pair of arms a loop interconnecting said arms to permit resilient separation thereof, projections on each arm intermediate its length and extending transversely thereof, said arms provided with toothed channelways adjacent their ends, said projections on said arms adapted to be received within the split portion of said piston skirt for engagement with the skirt on either side of said split, and a toothed key for reception in said toothed channelways for separating the arms and expanding the piston skirt.

2. A device for expanding the split skirt of a piston, including a pair of arms and an interconnecting loop therebetween, each arm provided with a toothed channeled end portion, the said end portions being divergently related, a projection transversely extending from an edge of each arm and substantially intermediate that portion of an arm included between the loop and a divergent end, said projections adapted for reception in the split portion of the piston skirt, and a toothed key for reception between said toothed channeled divergent ends of the arms for separating the arms and said projections for the purpose of resiliently expanding the piston skirt.

PAUL F. DANIELSON.

REFERENCES CITED

The following references are of record in the file of this patent:

UNITED STATES PATENTS

| Number | Name | Date |
|---|---|---|
| 2,145,426 | Milner | Jan. 31, 1939 |
| 2,150,062 | Johnston | Mar. 7, 1939 |
| 2,158,355 | Craven | May 16, 1939 |